(No Model.)

D. S. WEST.
WHEEL.

No. 454,315.　　　　　　　　Patented June 16, 1891.

Witnesses:
J. B. McGinn
Chas. F. Miller

Darrick S. West
Inventor
Attorney

UNITED STATES PATENT OFFICE.

DERRICK S. WEST, OF AUBURN, MAINE.

WHEEL.

SPECIFICATION forming part of Letters Patent No. 454,315, dated June 16, 1891.

Application filed October 18, 1890. Serial No. 368,598. (No model.)

*To all whom it may concern:*

Be it known that I, DERRICK S. WEST, a citizen of the United States, residing at Auburn, in the county of Androscoggin and State of Maine, have invented certain new and useful Improvements in Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in vehicle-wheels; and the leading object of my invention is the provision of a wheel which can be employed on light or heavy vehicles and which will be practically an elastic wheel, thus enabling the wheel to be employed on vehicles and the springs dispensed with.

A further object of my invention is the provision of an elastic wheel which can be made with a wood, or metal hub and wood, or metal spokes, which will be light in weight, and which will cause the vehicle to ride smoothly and easily to the comfort of the user.

A further object of my invention is the provision of an elastic wheel which, in addition to the other points of merit, will be simple, strong, and durable of construction and inexpensive to manufacture.

To attain the desired objects my invention consists of an elastic wheel constructed substantially as herein illustrated, described, and particularly defined and distinguished by the claims.

Figure 1:
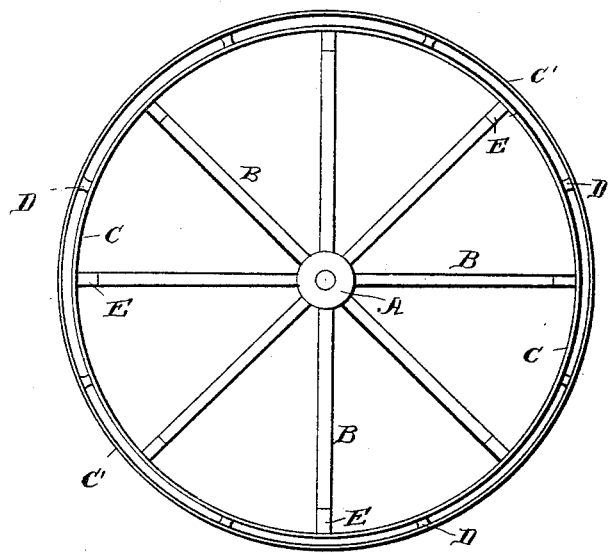
Figure 2:
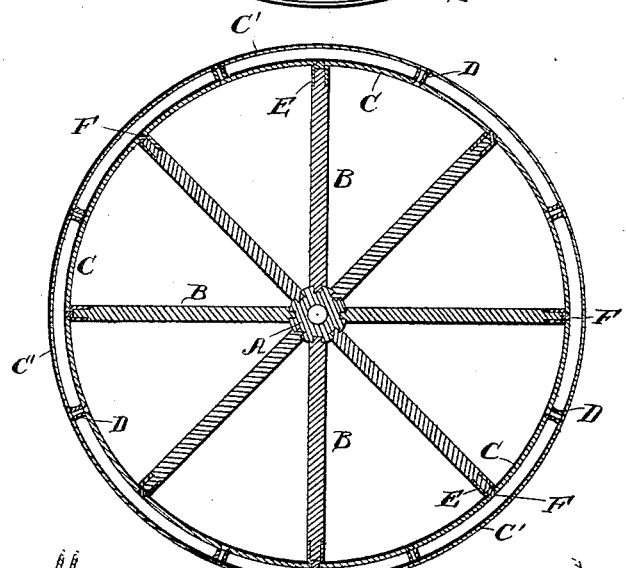
Figure 3:
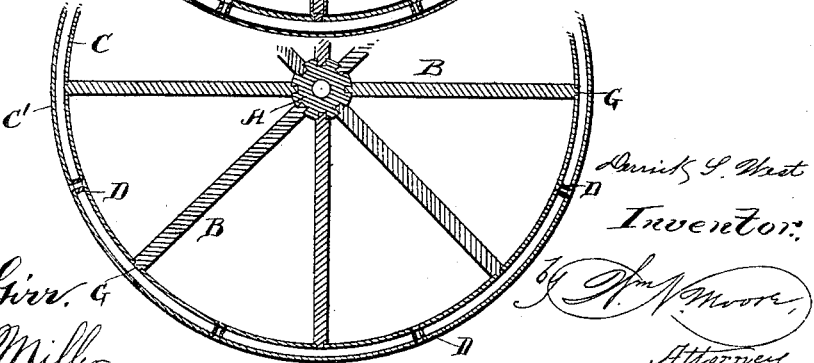

Figure 1 represents a side elevation of a vehicle-wheel constructed in accordance with and embodying my invention. Fig. 2 represents a vertical section thereof. Fig. 3 represents a vertical section of a wheel employing metal hub and spokes.

Referring by letter to the drawings, in which similar letters of reference denote corresponding parts in the three figures, A designates the hub of my wheel, which can be made of wood or metal, as may be desired.

B designates the spokes, of wood or metal.

C and C' designate the two steel rims, which are sustained a suitable distance apart by the ferrules or spools D.

When I employ wood spokes, I provide the socket-pieces E, which are formed with studs or lugs F, which enter openings in the inner steel rim C, and thus serve to secure the spokes in place.

When metal spokes are employed, the outer ends of the spokes are provided with lugs G, which enter openings in the inner rim of the wheel and secure the spokes in place.

The spools or ferrules are placed between the rims at equal distances apart and centrally between the spokes in order to secure the best results and to distribute the weight equally on the wheel and to secure the proper elastic or spring action.

The ferrules or spools are provided with an opening to receive a bolt for securing them to the rims, or the spools or ferrules may have lugs on their ends to enter holes in the rims, thus keeping rims and spools in position.

I have shown the space between the rims open; but I would have it understood that it may be filled with a suitable substance—that is, a substance which will not destroy the elasticity of the steel rims.

I prefer to have the steel rims about the same thickness, because I believe the result would be better; but they may be of different thicknesses, if desired, without damaging or impairing their efficiency.

It will be seen that I provide a wheel which is practically an elastic or spring wheel, which can be used on light or heavy vehicles, which will dispense with the use of springs, especially on heavy vehicles, where a small amount of spring action is required. It will also be seen that by arranging the spools or ferrules at equal distances apart and between the spokes the weight is equally distributed and supported and that the proper spring action is imparted to all parts of the wheel, rendering the riding of the vehicle smooth, light, and easy. It will also be seen that the wheel possesses the necessary features of strength, durability, and cheapness, and will commend itself as thoroughly practical and useful.

Having thus fully described my invention, I claim—

1. A vehicle-wheel consisting of the hub, the spokes, an inner elastic rim secured to the spokes, an outer rim of elastic metal, and spools or ferrules arranged between the rims at equal distances apart and between the spokes of the wheel, substantially as described.

2. A vehicle-wheel consisting of the hub, spokes, and rims, spools or ferrules between the rims at equal distances apart and between the spokes, and the socket-pieces fitting the outer ends of the spokes to secure them in place, substantially as described.

3. A vehicle-wheel consisting of the hub, spokes, rims, devices between the rims arranged at equal distances apart and centrally between the spokes for supporting them apart, said spokes having their outer ends formed with lugs to engage the inner rim, substantially as described.

4. A wheel consisting of a hub and spokes, an inner elastic rim, an outer rim, and spools arranged between the rims at equal distances apart and centrally between the spokes.

In testimony whereof I affix my signature in presence of two witnesses.

DERRICK S. WEST. [L. S.]

Witnesses:
WM. N. TITUS,
CHARLES F. SPEAR.